United States Patent
Darin et al.

(10) Patent No.: US 11,072,375 B2
(45) Date of Patent: Jul. 27, 2021

(54) CONTROL ARM WITH TUNABLE FRACTURE FEATURES

(71) Applicants: Eric A Darin, Royal Oak, MI (US); Scott E Zilincik, Troy, MI (US); Michael W Gaduski, Rochester Hills, MI (US); Amandeep S Gill, Rochester Hills, MI (US); Tusher M Phule, Auburn Hills, MI (US); Sara M Goldsworthy, Macomb, MI (US)

(72) Inventors: Eric A Darin, Royal Oak, MI (US); Scott E Zilincik, Troy, MI (US); Michael W Gaduski, Rochester Hills, MI (US); Amandeep S Gill, Rochester Hills, MI (US); Tusher M Phule, Auburn Hills, MI (US); Sara M Goldsworthy, Macomb, MI (US)

(73) Assignee: FCA US LLC, Auburn Hills, MI (US)

( * ) Notice: Subject to any disclaimer, the term of this patent is extended or adjusted under 35 U.S.C. 154(b) by 81 days.

(21) Appl. No.: 16/541,833

(22) Filed: Aug. 15, 2019

(65) Prior Publication Data
US 2020/0223271 A1    Jul. 16, 2020

Related U.S. Application Data

(60) Provisional application No. 62/792,046, filed on Jan. 14, 2019.

(51) Int. Cl.
*B62D 25/20* (2006.01)
*B62D 21/05* (2006.01)
(Continued)

(52) U.S. Cl.
CPC ......... *B62D 25/2045* (2013.01); *B60G 7/001* (2013.01); *B62D 21/05* (2013.01);
(Continued)

(58) Field of Classification Search
CPC ........ B62D 21/05; B62D 21/06; B60G 7/001; B60G 7/005; B60G 2204/1224;
(Continued)

(56) References Cited

U.S. PATENT DOCUMENTS

| 5,062,656 A | 11/1991 | Hynds et al. |
| 5,186,486 A | 2/1993 | Hynds et al. |

(Continued)

FOREIGN PATENT DOCUMENTS

| DE | 102010031089 A1 | 1/2012 |
| DE | 102012004682 A1 | 9/2013 |

(Continued)

*Primary Examiner* — Paul N Dickson
*Assistant Examiner* — Daniel M. Keck
(74) *Attorney, Agent, or Firm* — Ralph E Smith

(57) ABSTRACT

A control arm includes a wheel side end, a body side end, a first connecting member extending between the wheel side end and the body side end, a second connecting member extending between the wheel side end and the body side end, and having a reduced section portion, and a fracture zone extending through the first and second connecting members in a substantially fore-aft direction of the vehicle, the reduced section portion being within the fracture zone. A thickness of the reduced section portion is tunable to establish a controlled fracturing during a small overlap rigid barrier impact event where: (i) an initial fracture of the first connecting member occurs within the fracture zone, and (ii) a secondary fracture of the second connecting member occurs within the fracture zone at the reduced section portion, to thereby provide a desired rearward trajectory of the wheel assembly during the impact event.

19 Claims, 5 Drawing Sheets

(51) Int. Cl.
   *B62D 21/06* (2006.01)
   *B62D 21/15* (2006.01)
   *B62D 23/00* (2006.01)
   *B60G 7/00* (2006.01)
   *B62D 27/02* (2006.01)
   *B62D 25/14* (2006.01)
   *B62D 25/08* (2006.01)

(52) U.S. Cl.
   CPC ........... *B62D 21/06* (2013.01); *B62D 21/152* (2013.01); *B62D 21/157* (2013.01); *B62D 23/005* (2013.01); *B62D 27/02* (2013.01); *B62D 27/026* (2013.01); *B60G 7/005* (2013.01); *B60G 2204/1224* (2013.01); *B60G 2204/148* (2013.01); *B60G 2204/416* (2013.01); *B60G 2206/016* (2013.01); *B60G 2206/124* (2013.01); *B62D 25/081* (2013.01); *B62D 25/14* (2013.01)

(58) Field of Classification Search
   CPC ........ B60G 2204/148; B60G 2206/016; B60G 2206/124; B60G 2206/10; B60G 2206/123; B60G 3/06
   See application file for complete search history.

(56) References Cited

U.S. PATENT DOCUMENTS

| | | | |
|---|---|---|---|
| 5,275,436 A | 1/1994 | Pomero | |
| 5,516,130 A * | 5/1996 | Mitchell | B60G 3/20 280/124.134 |
| 5,700,025 A | 12/1997 | Lee | |
| 5,954,353 A | 9/1999 | Kincaid et al. | |
| 6,003,897 A | 12/1999 | Dostert et al. | |
| 6,149,166 A | 11/2000 | Struss et al. | |
| 6,511,119 B2 | 1/2003 | Takase et al. | |
| 6,866,115 B2 | 3/2005 | Miyasaka | |
| 7,556,273 B2 * | 7/2009 | Streubel | B60G 7/001 264/261 |
| 7,819,218 B2 | 10/2010 | Eichberger et al. | |
| 8,353,380 B2 | 1/2013 | Schönberger et al. | |
| 8,660,756 B2 | 2/2014 | Schrader | |
| 8,807,632 B2 | 8/2014 | Ramoutar et al. | |
| 8,991,544 B1 | 3/2015 | Stratten et al. | |
| 9,067,549 B2 | 6/2015 | Baccouche et al. | |
| 9,067,617 B2 | 6/2015 | Konchan et al. | |
| 9,079,619 B2 | 7/2015 | Gupta et al. | |
| 9,120,507 B1 | 9/2015 | Alwan et al. | |
| 9,174,679 B2 | 11/2015 | Klamser et al. | |
| 9,233,716 B2 | 1/2016 | Midoun et al. | |
| 9,327,763 B2 | 5/2016 | Maier | |
| 9,376,073 B2 | 6/2016 | Gupta et al. | |
| 9,376,144 B2 | 6/2016 | Shaner et al. | |
| 2005/0110284 A1 | 5/2005 | Browne et al. | |
| 2009/0302591 A1 | 12/2009 | Auer et al. | |
| 2010/0140965 A1 | 6/2010 | Schoenberger et al. | |
| 2011/0272911 A1 * | 11/2011 | Gerhards | B60G 7/001 280/124.134 |
| 2012/0153592 A1 * | 6/2012 | Mielke | B60G 3/04 280/124.134 |
| 2014/0062129 A1 | 3/2014 | Syed et al. | |
| 2014/0252742 A1 * | 9/2014 | Lam | B60G 7/003 280/124.134 |
| 2014/0339782 A1 | 11/2014 | Asjad | |
| 2015/0000995 A1 | 1/2015 | Konchan et al. | |
| 2015/0041236 A1 | 2/2015 | Chen | |
| 2015/0084322 A1 | 3/2015 | Killian et al. | |
| 2015/0137556 A1 | 5/2015 | Alavandi et al. | |
| 2015/0210315 A1 | 7/2015 | Maier | |
| 2015/0239503 A1 | 8/2015 | Hara | |
| 2015/0251615 A1 | 9/2015 | Cheng et al. | |
| 2016/0244098 A1 * | 8/2016 | Kanemori | B60G 3/06 |
| 2018/0354327 A1 * | 12/2018 | Giaier | B62D 21/11 |
| 2019/0381845 A1 * | 12/2019 | Matsumoto | B60G 3/225 |
| 2020/0130445 A1 * | 4/2020 | Fekete | B60G 7/001 |

FOREIGN PATENT DOCUMENTS

| | | |
|---|---|---|
| GB | 2555452 A | 5/2018 |
| WO | 2005110815 A1 | 11/2005 |
| WO | 2013006124 A1 | 1/2013 |

* cited by examiner

CONTROL ARM WITH TUNABLE FRACTURE FEATURES

CROSS REFERENCE TO RELATED APPLICATION

This application claims the benefit of U.S. Provisional Application No. 62/792,046, filed Jan. 14, 2019, the contents of which are incorporated in their entirety by reference thereto.

FIELD

The present application relates generally to vehicle control arms and, more particularly, to a vehicle front control arm with tunable fracture features to control wheel trajectory during impact events.

BACKGROUND

Controlling the wheel trajectory during small overlap, rigid barrier impact events can be an important factor in connection with reducing structural intrusion by directing energy through appropriate load paths such as frame and body structural members. Consistent wheel trajectory in independent front suspension is dictated by how the control arm behaves during an impact event. Inconsistent wheel trajectory during the impact event can alter the main load path through the vehicle structure. While such control arms do work well for their intended purpose, there remains a desire for improvement in the relevant art.

SUMMARY

In accordance with one example aspect of the invention, a control arm for a suspension of a vehicle is provided. In one exemplary implementation, the control arm includes a wheel side end configured to couple to a wheel assembly, a body side end configured to couple to a vehicle structural member, a first connecting member extending between the wheel side end and the body side end, a second connecting member extending between the wheel side end and the body side end, and having a reduced section portion, and a fracture zone extending through the first and second connecting members in a substantially fore-aft direction of the vehicle, the reduced section portion being within the fracture zone. A thickness of the reduced section portion is tunable to establish a controlled fracturing during a small overlap rigid barrier impact event where: (i) an initial fracture of the first connecting member occurs within the fracture zone, and (ii) a secondary fracture of the second connecting member occurs within the fracture zone at the reduced section portion, to thereby provide a desired rearward trajectory of the wheel assembly during the impact event.

In addition to the foregoing, the described control arm may include one or more of the following features: wherein the body side end includes a directional diagonal rib located proximate the reduced section portion and configured to strengthen the body side end and concentrate deformation in the reduced section portion to facilitate the secondary fracture; wherein the directional diagonal rib is triangular and includes a diagonal wall extending between a vertical wall and a lateral wall, wherein the vertical wall and the lateral wall are coupled to the body side end; and wherein the directional diagonal rib extends in a direction substantially toward the reduced section portion.

In addition to the foregoing, the described control arm may include one or more of the following features: wherein the body side end includes a fracture protection aperture located proximate the reduced section portion and configured to strengthen the body side end and concentrate deformation in the reduced section portion to facilitate the secondary fracture; wherein the fracture protection aperture includes opposed raised annular wall portions on opposite sides of the body side end, the raised annular wall portions defining an aperture configured to receive a portion of a stabilizer bar therein.

In addition to the foregoing, the described control arm may include one or more of the following features: wherein the wheel side end includes a ball joint portion configured to couple to a ball joint; wherein the body side end includes a front arm and a rear arm each configured to pivotably couple to the vehicle structural member; wherein the first connecting member extends between the ball joint portion and the front arm, and the second connecting member extends between the ball joint portion and the rear arm; an arm connecting member extending between the front arm and the rear arm; and wherein the desired wheel trajectory is substantially toward a rear of the vehicle without rotation toward an interior of the vehicle.

In accordance with another example aspect of the invention, a vehicle is provided. In one exemplary implementation, the vehicle includes a wheel assembly and a control arm. The control arm includes a wheel side end having a ball joint portion coupled to the wheel assembly, a body side end having a front arm and a rear arm pivotably coupled to the structural member, a leading connecting member extending between the ball joint portion and the front arm, and a trailing connecting member extending between the ball joint portion and the rear arm, and having a reduced section portion. A fracture zone extends through the first and second connecting members in a substantially fore-aft direction of the vehicle, and the reduced section portion is disposed within the fracture zone. A directional diagonal rib is located on the rear arm proximate the reduced section portion and is configured to strengthen a connection area between the trailing connecting member and the rear arm that is proximate the reduced section portion. During an impact event, the directional diagonal rib concentrates deformation of the control arm in the reduced section portion, and the reduced section portion causes impact forces transferred into the wheel side end to cause (i) an initial fracture of the leading connecting member within the fracture zone, and (ii) a secondary fracture of the trailing connecting member within the fracture zone at the reduced section portion, to thereby provide a desired trajectory of the wheel assembly during the impact event.

In addition to the foregoing, the described vehicle may include one or more of the following features: wherein the rear arm includes a fracture protection aperture located between the reduced section portion and the directional diagonal rib and configured to further strengthen the rear arm and concentrate deformation in the reduced section portion to further facilitate the secondary fracture; wherein the fracture protection aperture includes opposed raised annular wall portions on opposite sides of the body side end, the raised annular wall portions defining an aperture configured to receive a portion of a stabilizer bar therein; wherein the rear arm includes a structural webbing extending between a front peripheral structural wall and a rear peripheral structural wall; and wherein the directional diagonal rib is coupled to the front peripheral structural wall and the structural webbing and extends towards the rear peripheral structural wall.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Described herein are systems and methods for controlling wheel trajectory in small overlap, rigid barrier (SORB) impact events to reduce structural intrusion by directing the impact load through frame/body structural members of the vehicle. The systems include a control arm configured to consistently fracture at an engineered location at a predetermined time. Specifically, the control arm includes a directional diagonal rib to concentrate deformation to a localized, reduced section or thickness area for consistent fracture thereof during SORB impact events.

Figure 1:
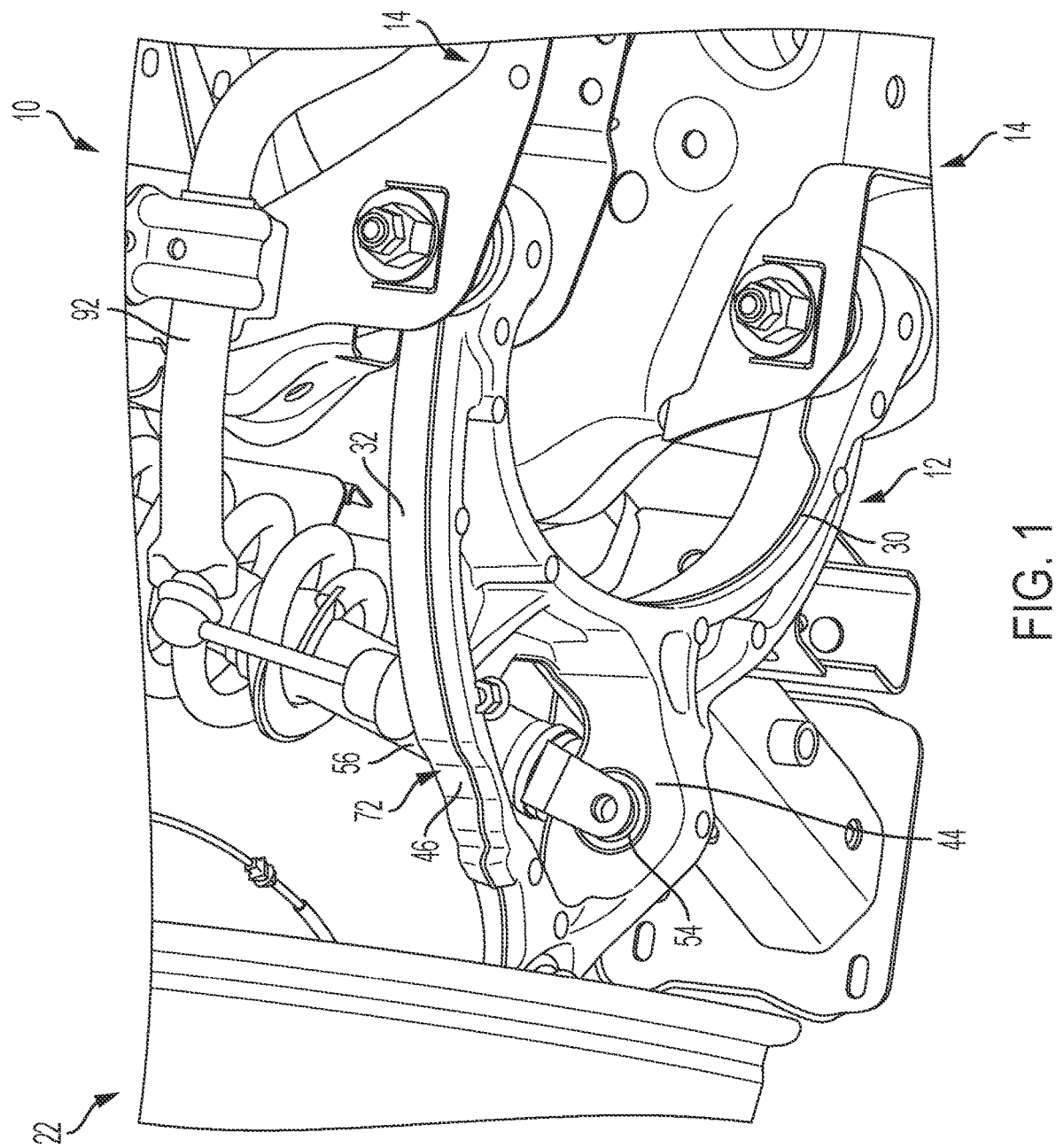
FIG. 1 is a top perspective view of a vehicle having an example control arm and surrounding support structure in accordance with the principles of the present application.

With reference to FIG. 1, an example control arm for a vehicle 10 is generally shown and indicated at 12. In the example embodiment, the control arm 12 is a generally A-shaped, one-piece casting independent suspension control arm. As described herein in more detail, the control arm 12 includes tunable fracture features configured to dictate wheel kinematics, thereby enabling the control arm 12 to control wheel trajectory during impact events to reduce structural intrusion by directing energy through a desired load path. In the case of the illustrated body on frame, the load is shared between the frame and body 14. However, it will be appreciated that control arm 12 is merely one example and the tunable features described herein may be utilized in various other control arms to provide a desired engineered fracture location and time depending on vehicle size, vehicle frame, impact event, or other variables and considerations.

Figure 2:
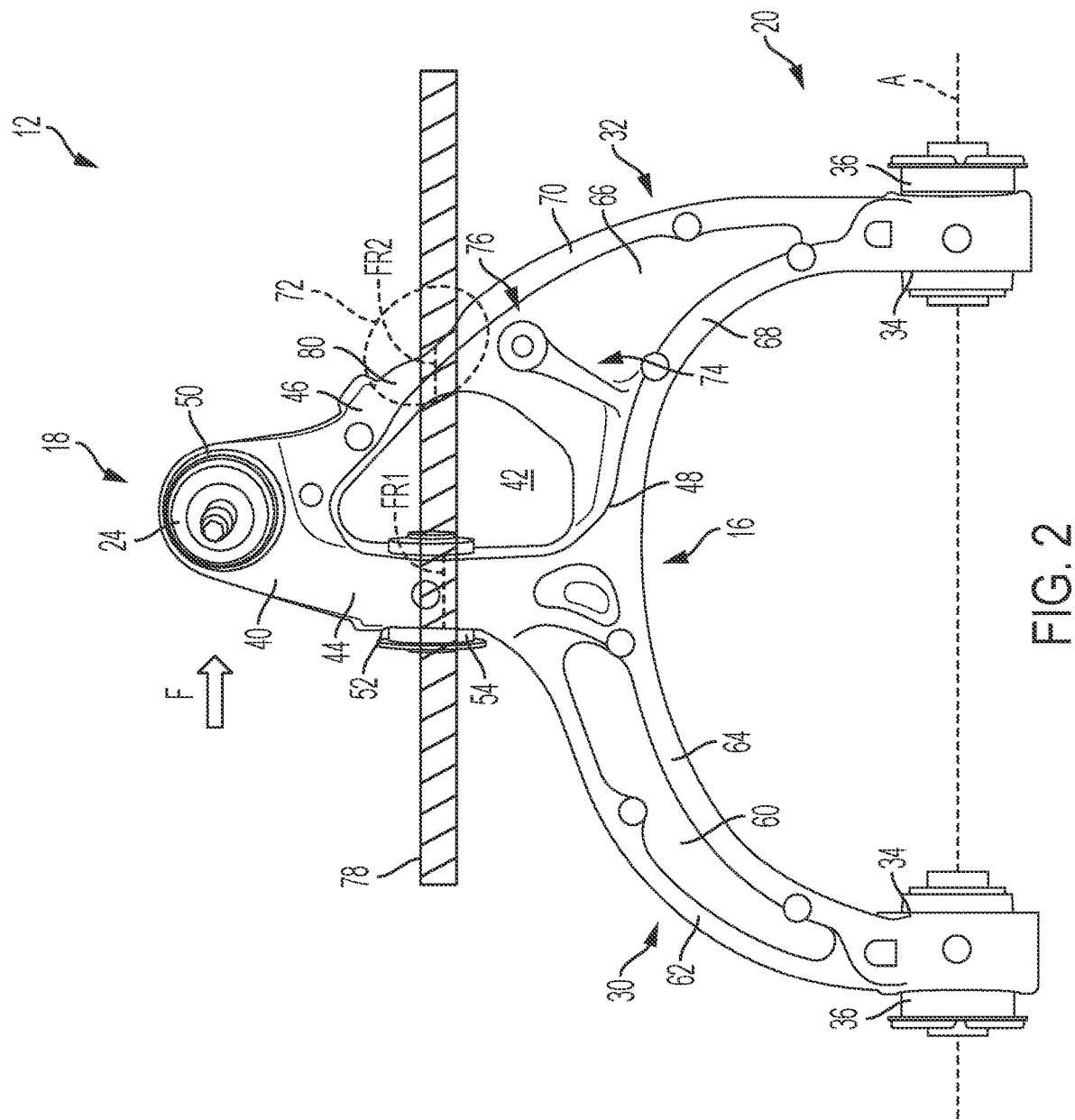
FIG. 2 is a top view of the example control arm shown in FIG. 1, in accordance with the principles of the present application.

With additional reference to FIG. 2, in the example embodiment, the control arm 12 generally includes a body 16 having a wheel side end 18 and a body side end 20. The wheel side end 18 is configured to couple to a wheel assembly 22 (FIG. 1) via a suspension arm ball joint 24, and the body side end 20 is configured to pivotably couple to the vehicle frame 14 about an axis 'A', which is parallel to or substantially parallel to a fore-aft vehicle axis (not shown). The body side end 20 includes a front arm 30 (i.e., arranged closer to a front of the vehicle) and a rear arm 32 (i.e., arranged closer to a rear of the vehicle), and each arm 30, 32 includes an aperture 34 configured to receive a bushing 36 (e.g., an elastomeric bushing).

In the example embodiment, the wheel side end 18 includes a ball joint portion 40 and an aperture 42 at least partially defining a first or leading connecting member 44, a second or trailing connecting member 46, and a third or arm connecting member 48. The ball joint portion 40 defines a bore 50 configured to receive ball joint 24, and the leading connecting member 44 defines an aperture 52 configured to receive a bushing 54 for connecting the control arm 12 to a shock 56 (FIG. 1). The leading connecting member 44 extends between the ball joint portion 40 and the front arm 30, the trailing connecting member 46 extends between the ball joint portion 40 and the rear arm 32, and the arm connecting member 48 extends between the front arm 30 and the rear arm 32.

As shown in the illustrated example, the front arm 30 includes a structural webbing 60 extending between a front peripheral structural wall 62 and a rear peripheral structural wall 64. Similarly, the rear arm 32 includes a structural webbing 66 extending between a front peripheral structural wall 68 and a rear peripheral structural wall 70.

With reference now to FIGS. 2-5, as briefly described above, the control arm 12 includes tunable features to establish an engineered fracture location and timing during an impact event. More specifically, as shown in FIG. 2, control arm 12 includes a reduced section or reduced thickness portion 72, a directional diagonal rib 74, and fracture protection aperture 76 configured to establish a fracture line or zone 78 for consistent fracture timing and location during impact events, particularly SORB impact events.

As described herein in more detail, the tunable features are configured to produce an initial fracture on the leading connecting member 44, and a subsequent secondary fracture on the trailing connecting member 46, both of which are located within the fracture zone 78. FIG. 2 illustrates example locations of initial fracture 'FR1' and secondary fracture 'FR2' within an example fracture zone 78 that extends parallel to or substantially parallel to a vehicle fore-aft axis. Such an orientation is configured to direct the wheel assembly 22 substantially vehicle aft instead of an inward rotation into the vehicle.

It will be appreciated, however, the width and orientation of fracture zone 78 is variable based on the tunable features and/or size, shape and materials of a particular control arm. Moreover, in some aspects, the direction or orientation of the fracture zone 78 delineates the general direction of the wheel assembly 22 during the impact event, due to the engineered fracturing of the control arm. Thus, the tunable features described herein are adjustable to establish a desired orientation of fracture zone 78 to thereby provide a desired trajectory for the wheel assembly 22 during the impact event.

Figure 3:
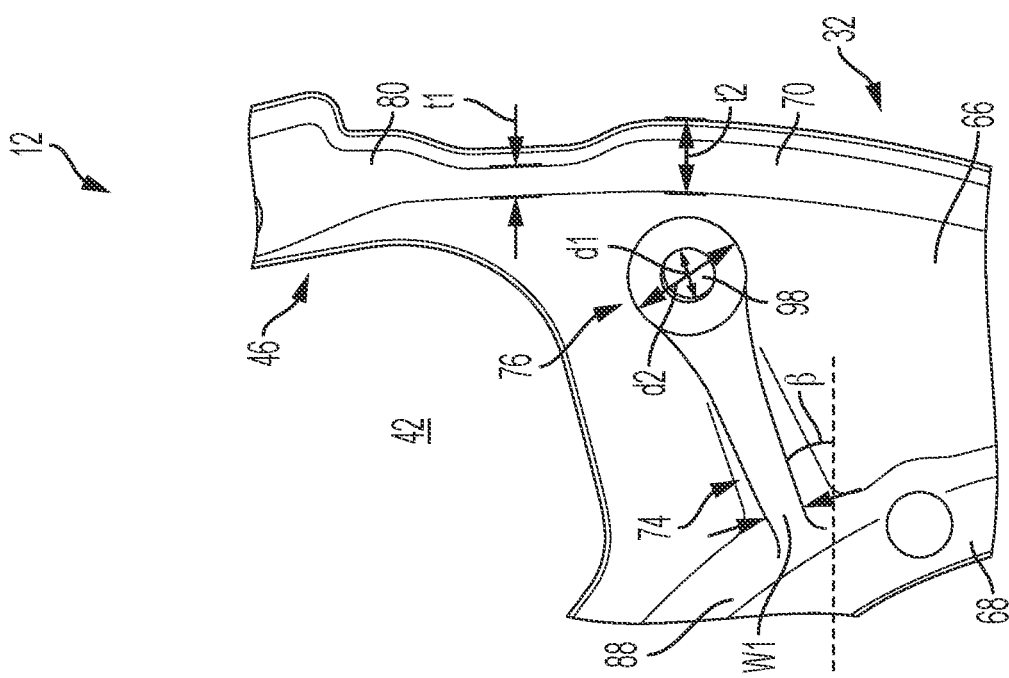
FIG. 3 is an enlarged top view of a portion of the control arm shown in FIG. 2, in accordance with the principles of the present application.

In the example embodiment, the reduced thickness portion 72 is formed on the trailing connecting member 46. As illustrated in FIGS. 2 and 3, the trailing connecting member 46 includes a peripheral structural wall 80 connected with the rear arm rear peripheral structural wall 70. In the reduced thickness portion 72, the peripheral structural wall 80 has a thickness 't1' that is less than a thickness 't2' of the peripheral structural walls 70, 80 outside of the reduced thickness portion 72. Due to its reduced thickness and thus reduced structural strength relative to the thicker surrounding areas, an impact force 'F' (FIG. 2) into the control arm ball joint portion 40 (via wheel assembly 22) causes the trailing connecting member 46 to fracture at this location (e.g., 'FR2').

Moreover, the thicknesses 't1' and 't2' are tunable in order to control the timing of the fracture. For example, a relatively smaller thickness will fracture at a faster predetermined time than a relatively larger thickness 't1'. Thus, the timing of that fracture is tunable by varying thicknesses 't1' and/or 't2'. In other examples, a relatively smaller thickness 't1' is utilized for lighter vehicles, while a relatively larger thickness 't1' is utilized for heavier vehicles. As such, not only does the reduces thickness portion 72 engineer the fracture location of the trailing connecting member 46, it is also customizable for different vehicle configurations.

Figure 4:
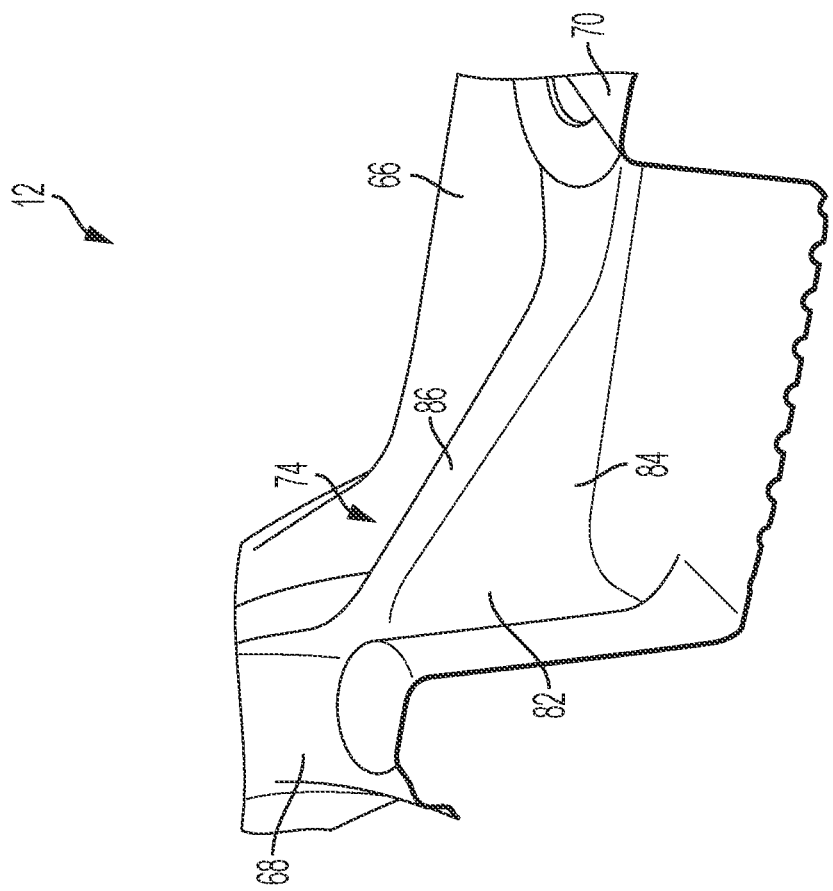
FIG. 4 is an enlarged perspective view of a portion of the control arm shown in FIG. 2, in accordance with the principles of the present application.
Figure 5:
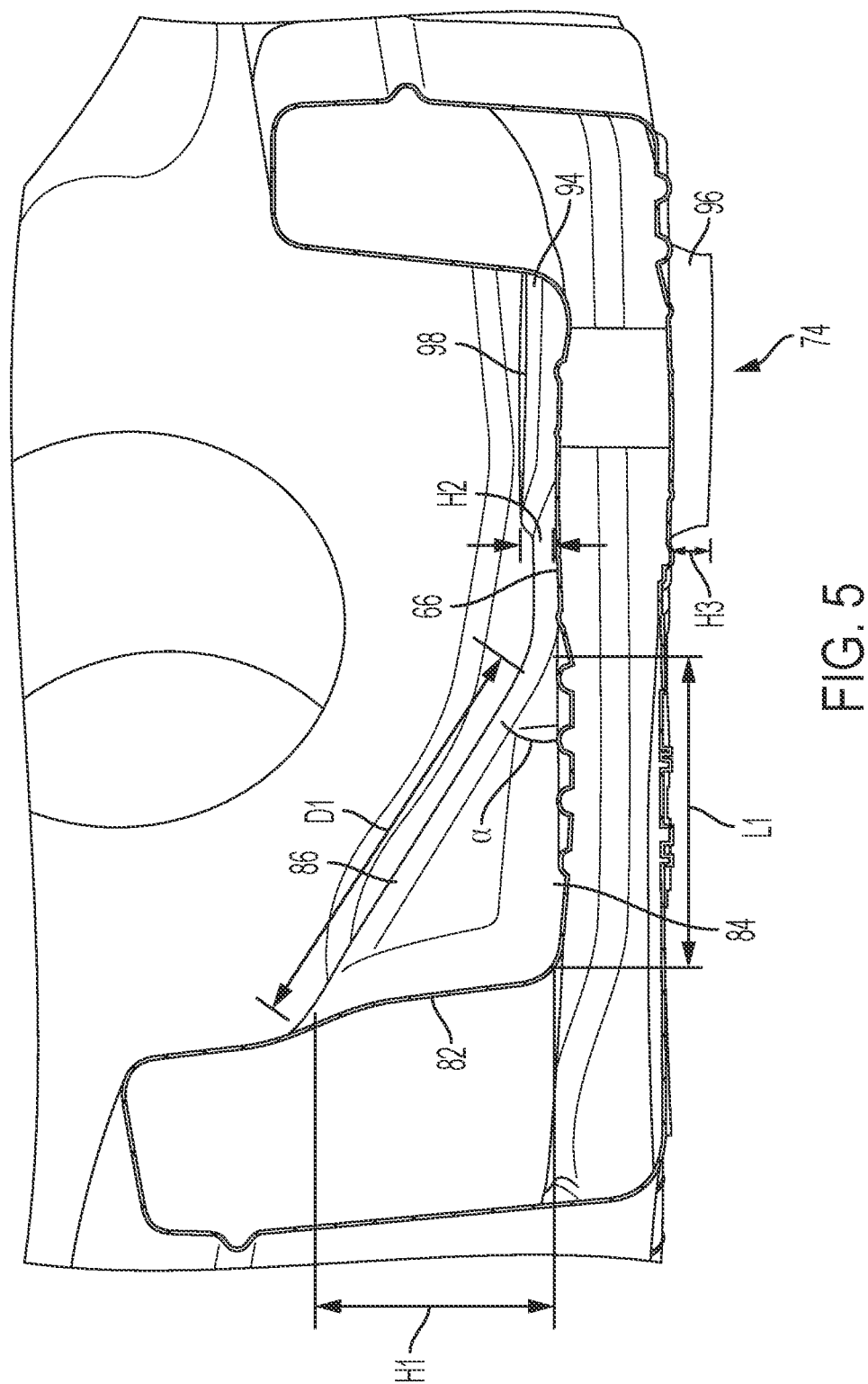
FIG. 5 is a sectional view of a portion of the control arm shown in FIG. 2, in accordance with the principles of the present application.

In the example embodiment, the directional diagonal rib 74 is generally coupled to and extends from the rear arm front peripheral structural wall 68 toward the rear peripheral structural wall 70. As shown in FIGS. 4 and 5, the directional diagonal rib 74 is generally triangular and includes a vertical wall 82, a lateral wall 84, and a diagonal wall 86. The vertical wall 82 is coupled to an inside 88 of the front peripheral structural wall 68 and has a height 'H1'. The lateral wall 84 is coupled to an upper surface 90 of the structural webbing 66 and has a length 'L1'. The diagonal wall 86 extends diagonally between the vertical wall 82 and the lateral wall 84 at angle 'α' for a distance 'D1'. Moreover, in the illustrated example, the diagonal wall 86 has a width 'W1' that diverges as it extends outward from the front peripheral structural wall 68 (see FIG. 3). Further, in the example embodiment, the directional diagonal rib 74 extends at an angle 'β' relative to the fore-aft axis of the vehicle.

In the example embodiment, the directional diagonal rib 74 is configured to concentrate deformation of the control arm to a localized area (i.e., the reduced thickness portion 72) for consistent fracture at that location. More specifically, the directional diagonal rib 74 provides control arm 12 with an increased strength along the rear portion of the body side member 68 and concentrates deformation in the reduced thickness portion to facilitate the secondary fracture in the reduced thickness portion 72. Thus, during the impact event when forces are imparted to the rear arm 32 through the trailing connecting member 46, rather than the rear arm 32 deforming and absorbing the forces (e.g., bending) or fracturing along the bottom side member 68, the diagonal rib 74 provides structural reinforcement to prevent or reduce such deformation, thereby at least partially causing the forces to fracture the control arm 12 at the location of the reduced thickness portion 72. In this way, one or more of the features (e.g., 'H1', 'L1', 'α', 'D1', 'W1', 'β') of the directional diagonal rib 74 are tunable in order to provide the desired deformation concentration at the desired localized area.

In the example embodiment, the fracture protection aperture 76 is formed in the structural webbing 66 of the rear arm 32 and is configured to receive a portion of a stabilizer bar 92 (FIG. 1) therethrough. The fracture protection aperture 76 is located at the base of the directional diagonal rib 74 generally between the rib 74 and the rear peripheral structural wall 70, and is configured to provide stiffness in the vertical direction for the stabilizer bar 92. As shown in FIG. 5, the fracture protection aperture 76 includes raised annular wall portions 94, 96 defining an aperture 98. The raised annular wall portions 94, 96 extend respectively upward and downward from structural webbing 66 and provide increased structural support in the surrounding area. The annular wall portion 94 extends at a height 'H2' above the structural webbing 66, the annular wall portion 96 extends at a height 'h3' below the structural webbing 66, the aperture 98 has a diameter 'd1', and the annular wall portions 96 have a thickness or diameter 'd2'.

Similar to the diagonal rib 74, the fracture protection aperture 76 provides structural reinforcement to prevent or reduce deformation, thereby at least partially causing the impact forces to fracture the control arm 12 at the location of the reduced thickness portion 72. In this way, one or more of the features (e.g., 'H2', 'H3', 'd2') of the fracture protection aperture 76 are tunable in order to provide the desired deformation concentration at the desired localized area. Moreover, the aperture 98 enables the structure to be relatively stronger than the connection to the stabilizer bar 92, thereby allowing the stabilizer bar 92 to pull out during the impact event. In the event the stabilizer bar connection would be stronger than the fracture protection aperture 76, a crack may initiate at the edge of the aperture 98 when the full suspension incurs loading from the impact event.

As briefly discussed above, one purpose of control arm 12 is to control the trajectory of the wheel assembly 22 during the crash event by reducing or preventing torsion of the ball joint portion 40 about the connection of the rear member to the frame. Such torsion of known control arms, in some impact events, can cause a wheel assembly to rotate into and intrude a passenger or occupant compartment of a vehicle. Accordingly, in contrast, the presently described control arm 12 tunes the various locations/characteristics of the reduced thickness portion 72, the directional diagonal rib 74, and the fracture protection aperture 76, to actively engineer the control arm fractures to be located within the fracture zone 78 and to occur at a predetermined time that reduces or prevents torsion at reduced thickness portion 72 after the initial fracture 'FR1'.

As such, this causes the ball joint portion 40 to fracture from the rest of the control arm 12 in the fracture zone 78 firstly at the leading connecting member 44 and subsequently at the trailing connecting member 46, with little or no torsion at the reduced thickness portion 72. This enables the wheel assembly 22 to be forced directly rearward in the wheel well toward the vehicle structural body/frame 14 for absorption thereof. Accordingly, the engineered fracturing directs the impact forces through a predetermined load path without rotation into and intrusion of a driver/front occupant compartment lower leg area 100 (e.g., see FIG. 6), thereby reducing potential lower leg injury during such events.

Figure 6:
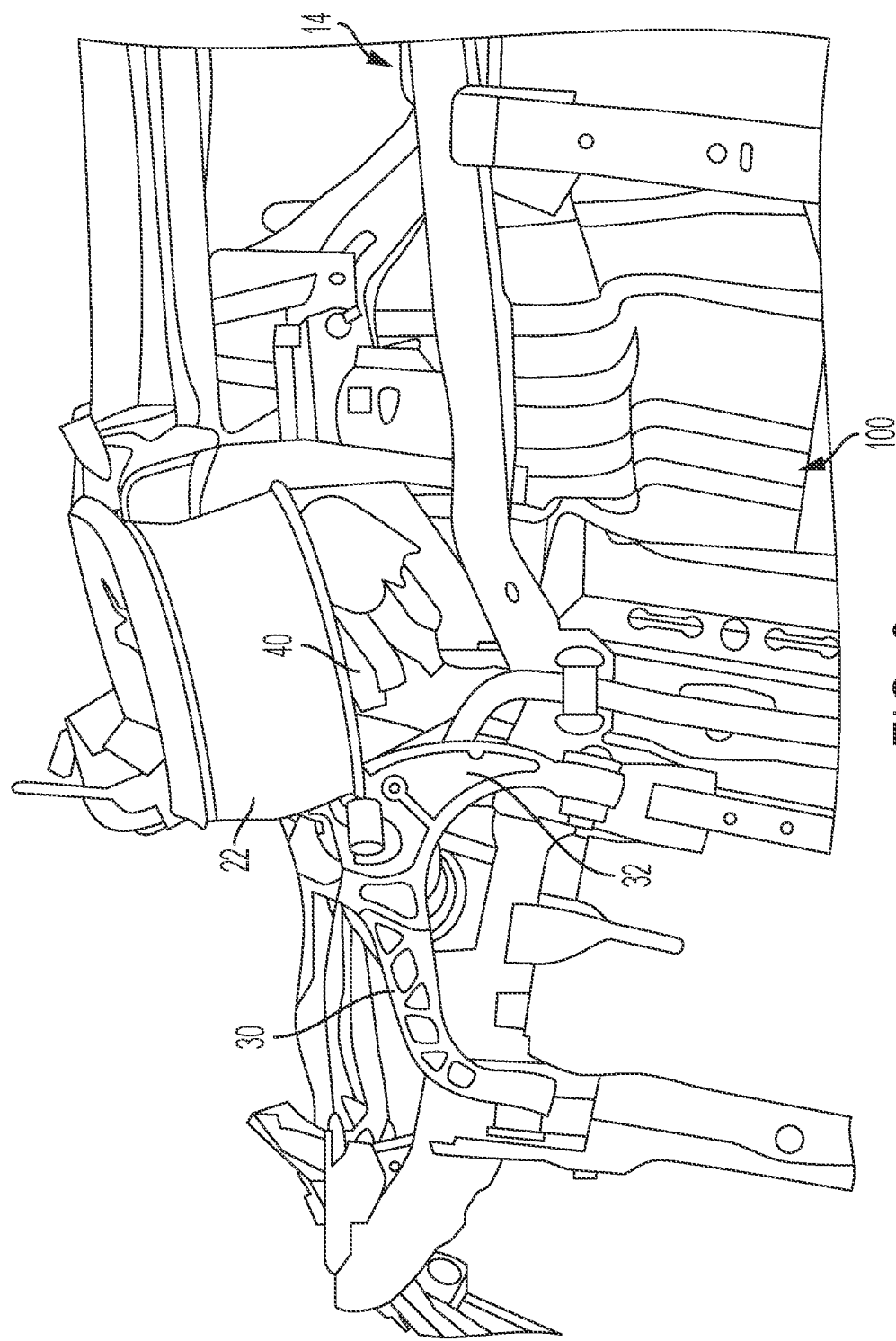
FIG. 6 is a bottom view of the vehicle shown in FIG. 1 after an example small overlap, rigid barrier crash event, illustrating a wheel assembly directed vehicle aft, in accordance with the principles of the present application.

With reference now to FIGS. 2 and 6, one example SORB impact event will be described. In the example event, the vehicle 10 impacts an object (not shown) causing impact forces to travel through the wheel assembly 22 resulting in transfer of a force 'F' (FIG. 2) into the control arm ball joint portion 40. The force 'F' causes an initial fracture 'FR1' across the leading connecting member 44 within the fracture zone 78. As the force 'F' continues to act on the ball joint portion 40, the ball joint portion 40 would tend to rotate about the trailing connecting member 46. However, because of the reduced thickness portion 72, the directional diagonal rib 74, and the fracture protection aperture 76, a secondary fracture 'FR2' is caused across the trailing connecting member 46 within the fracture zone 78.

As such, the secondary fracture 'FR2' occurs substantially in-line with the initial fracture 'FR1' before little or any rotation of the ball joint portion 40, thereby engineering the timing of fractures 'FR1' and 'FR2' to detach the ball joint portion 40 and wheel assembly 22 from the remaining portion of control arm 12. This enables the impact force to drive the wheel assembly 22 substantially rearward into supporting vehicle structure 14 to absorb the impact and prevent rotation of the wheel assembly 22 that could result in intrusion into the occupant compartment 100. Moreover, in some examples, direct loading of the wheel assembly 22 into the vehicle structure 14 can fracture the wheel rim into multiple pieces to reduce overall stack-up with the vehicle structural system.

Although it is appreciated that control arm features described herein are tunable to produce consistent fracture timing and location for a given vehicle/control arm, example tunable features are provided below. In one example, thickness 't1' is between approximately 8.0 mm and approximately 12.0 mm, or between 8.0 mm and 12.0 mm. In another example, thickness 't1' is 10.0 mm or approximately 10.0 mm. In another example, thickness 't2' is between approximately 13.0 mm and approximately 17.0 mm, or between 13.0 mm and 17.0 mm. In another example, thickness 't2' is 15.0 mm or approximately 15.0 mm. In yet another example, thickness 't1' is between approximately 60% to approximately 70% of thickness 't2' or between 60% and 70% of thickness 't2'.

In one example, height 'H1' is between approximately 30 mm and approximately 50 mm, or between 30 mm and 50 mm; is between approximately 40 mm and approximately 50 mm, or between 40 mm and 50 mm; angle 'α' is between approximately 30° and approximately 40°, or between 30° and 40°; distance 'D1' is between approximately 50 mm and approximately 70 mm, or between 50 mm and 70 mm; width 'W1' is between approximately 6.0 mm and approximately 17 mm, or between 6.0 mm and 17 mm; and angle 'β' is between approximately 70 degrees and approximately 100 degrees, or between 70 degrees and 100 degrees.

In one example, height 'H2' is between approximately 4.0 mm and approximately 10.0 mm, or between 4.0 mm and 10.0 mm; height 'H3' is between approximately 4.0 mm and approximately 10.0 mm, or between 4.0 mm and 10.0 mm; diameter 'd1' is between approximately 7.5 mm and approximately 17.5 mm, or between 7.5 mm and 17.5 mm; and diameter 'd2' is between approximately 15 mm and approximately 35 mm, or between 15 mm and 35 mm.

Described herein are systems and methods for controlling wheel trajectory during SORB impact events to reduce structural intrusion by direct impact load through frame/body systems. The systems include a control arm configured to consistently and reliably fracture in a fracture zone at a predetermined fracture time to achieve the desired wheel trajectory during SORB impact events. This consistent fracture is accomplished with a directional diagonal rib and fracture protection aperture to concentrate deformation in a localized area having a tunable reduced thickness.

Moreover, loading of the wheel into the frame/body systems can advantageously fracture the wheel rim into many pieces to reduce overall stack up with the structural system. In addition, the engineered fracture location enables the wheel to exit the wheel well upon loading, thereby providing increased crushable space from where the wheel was pre-crash. As such, the described control arm is weight and cost neutral, enables consistency in the fracture timing and location in the control arm to achieve a desired wheel trajectory, and enables the ability to maintain other control arm requirements such as, for example, fatigue life assessments, wash out, durability, vehicle dynamics, and NVH.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A control arm for a suspension of a vehicle, the control arm comprising:
   a wheel side end configured to couple to a wheel assembly;
   a body side end configured to couple to a vehicle structural member;
   a first connecting member extending between the wheel side end and the body side end;
   a second connecting member extending between the wheel side end and the body side end, and having a reduced section portion; and
   a fracture zone extending through the first and second connecting members in a substantially fore-aft direction of the vehicle, the reduced section portion being within the fracture zone,
   wherein the reduced section portion is tunable to establish a controlled and consistent fracturing time and location during a small overlap rigid barrier impact event where: (i) an initial fracture of the first connecting member occurs within the fracture zone in a direction substantially parallel to the vehicle fore-aft direction, and (ii) a secondary fracture of the second connecting member occurs within the fracture zone at the reduced section portion in a direction substantially parallel to the vehicle fore-aft direction, to thereby provide a desired rearward trajectory of the wheel assembly during the impact event.

2. The control arm of claim 1, wherein the body side end includes a directional diagonal rib located proximate the reduced section portion and configured to strengthen the body side end and concentrate deformation in the reduced section portion to facilitate the secondary fracture.

3. The control arm of claim 2, wherein the directional diagonal rib is triangular and includes a diagonal wall extending between a vertical wall and a lateral wall, wherein the vertical wall and the lateral wall are coupled to the body side end.

4. The control arm of claim 3, wherein the directional diagonal rib extends in a direction substantially toward the reduced section portion.

5. The control arm of claim 1, wherein the body side end includes a fracture protection aperture located proximate the reduced section portion and configured to strengthen the body side end and concentrate deformation in the reduced section portion to facilitate the secondary fracture.

6. The control arm of claim 5, wherein the fracture protection aperture includes opposed raised annular wall portions on opposite sides of the body side end, the raised annular wall portions defining an aperture configured to receive a portion of a stabilizer bar therein.

7. The control arm of claim 1, wherein the wheel side end includes a ball joint portion configured to couple to a ball joint.

8. The control arm of claim 7, wherein the body side end includes a front arm and a rear arm each configured to pivotably couple to the vehicle structural member.

9. The control arm of claim 8, wherein the first connecting member extends between the ball joint portion and the front arm, and the second connecting member extends between the ball joint portion and the rear arm.

10. The control arm of claim 9, further comprising an arm connecting member extending between the front arm and the rear arm.

11. The control arm of claim 1, wherein the desired wheel trajectory is substantially toward a rear of the vehicle without rotation toward an interior of the vehicle.

12. A vehicle comprising:
a structural member and a wheel assembly; and
a control arm comprising:
- a wheel side end having a ball joint portion coupled to the wheel assembly;
- a body side end having a front arm and a rear arm pivotably coupled to the structural member;
- a leading connecting member extending between the ball joint portion and the front arm;
- a trailing connecting member extending between the ball joint portion and the rear arm, and having a reduced section portion;
- a fracture zone extending through the leading and trailing connecting members in a substantially fore-aft direction of the vehicle, the reduced section portion disposed within the fracture zone; and
- a directional diagonal rib located on the rear arm proximate the reduced section portion and configured to strengthen a connection area between the trailing connecting member and the rear arm that is proximate the reduced section portion, wherein during an impact event, the directional diagonal rib concentrates fracture of the control arm in the reduced section portion, and the reduced section portion causes impact forces transferred into the wheel side end to cause (i) an initial fracture of the leading connecting member within the fracture zone, and (ii) a secondary fracture of the trailing connecting member within the fracture zone at the reduced section portion, to thereby provide a desired trajectory of the wheel assembly during the impact event.

13. The vehicle of claim 12, wherein the rear arm includes a fracture protection aperture located between the reduced section portion and the directional diagonal rib and configured to further strengthen the rear arm and concentrate deformation in the reduced section portion to further facilitate the secondary fracture.

14. The vehicle of claim 13, wherein the fracture protection aperture includes opposed raised annular wall portions on opposite sides of the body side end, the raised annular wall portions defining an aperture configured to receive a portion of a stabilizer bar therein.

15. The vehicle of claim 12, wherein the rear arm includes a structural webbing extending between a front peripheral structural wall and a rear peripheral structural wall.

16. The vehicle of claim 15, wherein the directional diagonal rib is coupled to the front peripheral structural wall and the structural webbing and extends towards the rear peripheral structural wall.

17. The vehicle of claim 12, wherein the reduced section portion is a reduced thickness.

18. The vehicle of claim 15, wherein the reduced section portion includes a reduced thickness of a portion of the rear peripheral structural wall.

19. The vehicle of claim 12, wherein the leading connection member includes an aperture to receive a bushing for connecting the control arm to a shock.

* * * * *